United States Patent
Roberts

(10) Patent No.: US 10,431,031 B2
(45) Date of Patent: Oct. 1, 2019

(54) REMOTE ELECTRONIC PHYSICAL LAYER ACCESS CONTROL USING AN AUTOMATED INFRASTRUCTURE MANAGEMENT SYSTEM

(71) Applicants: CommScope Technologies LLC, Hickory, NC (US); CommScope Connectivity UK Limited, London (GB)

(72) Inventor: Andrew P. Roberts, Wales (GB)

(73) Assignees: CommScope Technologies LLC, Hickory, NC (US); CommScope Connectivity UK Limited, London (GB)

( * ) Notice: Subject to any disclaimer, the term of this patent is extended or adjusted under 35 U.S.C. 154(b) by 119 days.

(21) Appl. No.: 15/109,574

(22) PCT Filed: Dec. 15, 2014

(86) PCT No.: PCT/US2014/070254
§ 371 (c)(1),
(2) Date: Jul. 1, 2016

(87) PCT Pub. No.: WO2015/102857
PCT Pub. Date: Jul. 9, 2015

(65) Prior Publication Data
US 2016/0328903 A1  Nov. 10, 2016

Related U.S. Application Data

(60) Provisional application No. 61/923,285, filed on Jan. 3, 2014.

(51) Int. Cl.
*G07C 9/00* (2006.01)
*G06K 9/00* (2006.01)
(Continued)

(52) U.S. Cl.
CPC .......... *G07C 9/00912* (2013.01); *E05B 47/00* (2013.01); *E05B 65/006* (2013.01);
(Continued)

(58) Field of Classification Search
CPC .......... G06Q 10/06311; G06Q 10/103; G06K 9/00221; G06F 21/32; G06F 21/34
See application file for complete search history.

(56) References Cited

U.S. PATENT DOCUMENTS 7,004,389 B1 * 2/2006 Robinson ............... G06Q 10/06
235/375
2006/0139149 A1  6/2006 Faro et al.
(Continued)

OTHER PUBLICATIONS

International Search Authority, "International Search Report and Written Opinion for PCT/US2014/070254", dated Mar. 31, 2015, pp. 1-12, Published in: WO.
(Continued)

*Primary Examiner* — Nabil H Syed
(74) *Attorney, Agent, or Firm* — Fogg & Powers LLC

(57) ABSTRACT

Systems and methods for physical layer access control are provided. In one embodiment, a method using an automated infrastructure management system comprising a portable device, a management system and a secured equipment cabinet comprises: scanning an asset ID tag with the portable device to obtain asset ID data; transmitting the asset ID data to the management system; verifying whether the asset ID data is associated with an electronic lock identified by an electronic work order, where the work order defines tasks involving a network device within the cabinet; scanning a fingerprint with the portable device to obtain fingerprint ID data; and verifying whether the fingerprint ID data matches an authorized technician. When the asset ID data is verified as associated with the electronic lock and the fingerprint ID data is verified as matching the authorized technician, send-
(Continued)

ing an electronic command from the management system that unlocks the electronic lock.

25 Claims, 3 Drawing Sheets

(51) Int. Cl.
*E05B 47/00* (2006.01)
*E05B 65/00* (2006.01)
*G06Q 10/06* (2012.01)

(52) U.S. Cl.
CPC ..... *G06K 9/00087* (2013.01); *G07C 9/00563* (2013.01); *G07C 9/00571* (2013.01); *G06Q 10/06* (2013.01); *G07C 2009/00095* (2013.01)

(56) References Cited

U.S. PATENT DOCUMENTS

| | | |
|---|---|---|
| 2007/0247276 A1 | 10/2007 | Murchison et al. |
| 2009/0237203 A1 | 9/2009 | Determan et al. |
| 2010/0321153 A1 | 12/2010 | Bose et al. |
| 2011/0016971 A1 | 1/2011 | Yulkowski et al. |
| 2012/0095926 A1 | 4/2012 | Nishimura et al. |
| 2012/0119874 A1 | 5/2012 | Ciervo et al. |
| 2013/0290963 A1 | 10/2013 | Simske et al. |
| 2013/0133102 A1 | 12/2013 | Rose et al. |
| 2013/0331027 A1 | 12/2013 | Rose et al. |
| 2014/0002236 A1* | 1/2014 | Pineau ............... G06F 21/32 340/5.6 |
| 2014/0089028 A1* | 3/2014 | Marshall .......... G06Q 10/06311 705/7.15 |
| 2014/0244329 A1* | 8/2014 | Urban ............ G06Q 10/063114 705/7.15 |
| 2015/0262021 A1* | 9/2015 | Som De Cerff ........ H04W 4/02 382/182 |

OTHER PUBLICATIONS

European Patent Office, "Extended Search Report from EP Application No. 14876899.7 dated Aug. 3, 2017", "from Foreign Counterpart of U.S. Appl. No. 15/109,574", dated Aug. 3, 2017, pp. 1-8, Published in: EP.
Emerson Service Data Sheet; "Wireless Mobile Worker"; Oct. 2012; pp. 1-5; Emerson Process Management; www.EmersonProcess.com/SmartWireless.
European Patent Office; "Communication pursuant to Article 94(3) EPC, from EP Application No. 14876899.7, dated Dec. 7, 2018"; from Foreign Counterpart of U.S. Appl. No. 15/109,574; pp. 1-5; dated Dec. 7, 2018; Published: US.
Jain, Anil, et al.; "On-Line Fingerprint Verification"; IEEE Transactions on Pattern Analysis and Machine INtelligence; vol. 19, No. 4; Apr. 1997; pp. 302-314.
Malone, Gene E., Sr.; "Infrastructure Administration: Automated Infrastructure Management (AIM) Systems"; Bicsi; TE Connectivity; pp. 1-41; Retrieved Dec. 5, 2013.
Motorola; "The Motorola ES400"; Global 3.5G Enterprise Digital Assistant (EDS); SuperTech, Inc.; Published: US; pp. 1-12; Retrieved Dec. 5, 2013.
MWETANA Solutions; "Software Applications developed by MWETANA"; www.mwetana.com.lr/products.php; retrieved on Dec. 10, 2013; pp. 1-3; MWETANA Consulting & Technology Group.
The McCormick Letter; "A McCormick First: Put a "Signable" Electronic Work Order Into Your Service Electricians Hands"; Nov. 2001; pp. 1-4; McCormick Systems; Published: US.

* cited by examiner

US 10,431,031 B2

REMOTE ELECTRONIC PHYSICAL LAYER ACCESS CONTROL USING AN AUTOMATED INFRASTRUCTURE MANAGEMENT SYSTEM

CROSS REFERENCE TO RELATED APPLICATIONS

This Application claims priority to, and benefit of, PCT Application No. PCT/US2014/070254, entitled "REMOTE ELECTRONIC PHYSICAL LAYER ACCESS CONTROL USING AN AUTOMATED INFRASTRUCTURE MANAGEMENT SYSTEM" filed on Dec. 15, 2014, which claims priority to U.S. Provisional Patent Application No. 61/923,285, entitled "REMOTE ELECTRONIC PHYSICAL LAYER ACCESS CONTROL USING AN AUTOMATED INFRASTRUCTURE MANAGEMENT SYSTEM" filed on Jan. 3, 2014, all of which are incorporated herein by reference.

BACKGROUND

One common use of an automated infrastructure management (AIM) system is to guide a technician in moving, adding, or changing a connection made at a patch panel or other device where connections are made using cables. This is commonly done as a part of a larger "work order" that includes one or more steps. Completing a series of tasks set forth in a work order can often involve travel to remote unmanned or high security facilities. Equipment cabinets at these facilities are typically locked to prevent tampering and or other unauthorized alterations within the cabinets. As the infrastructure for systems such as wireless communication systems and co-located data centers continue to expand, a need has arisen for improved access control to such facilities.

SUMMARY

Systems and methods for physical layer access control are provided. In one embodiment, a method using an automated infrastructure management system comprising a portable device, a management system and a secured equipment cabinet comprises: scanning an asset ID tag with the portable device to obtain asset ID data; transmitting the asset ID data to the management system; verifying whether the asset ID data is associated with an electronic lock identified by an electronic work order, where the work order defines tasks involving a network device within the cabinet; scanning a fingerprint with the portable device to obtain fingerprint ID data; and verifying whether the fingerprint ID data matches an authorized technician. When the asset ID data is verified as associated with the electronic lock and the fingerprint ID data is verified as matching the authorized technician, sending an electronic command from the management system that unlocks the electronic lock.

DRAWINGS

Figure 2:
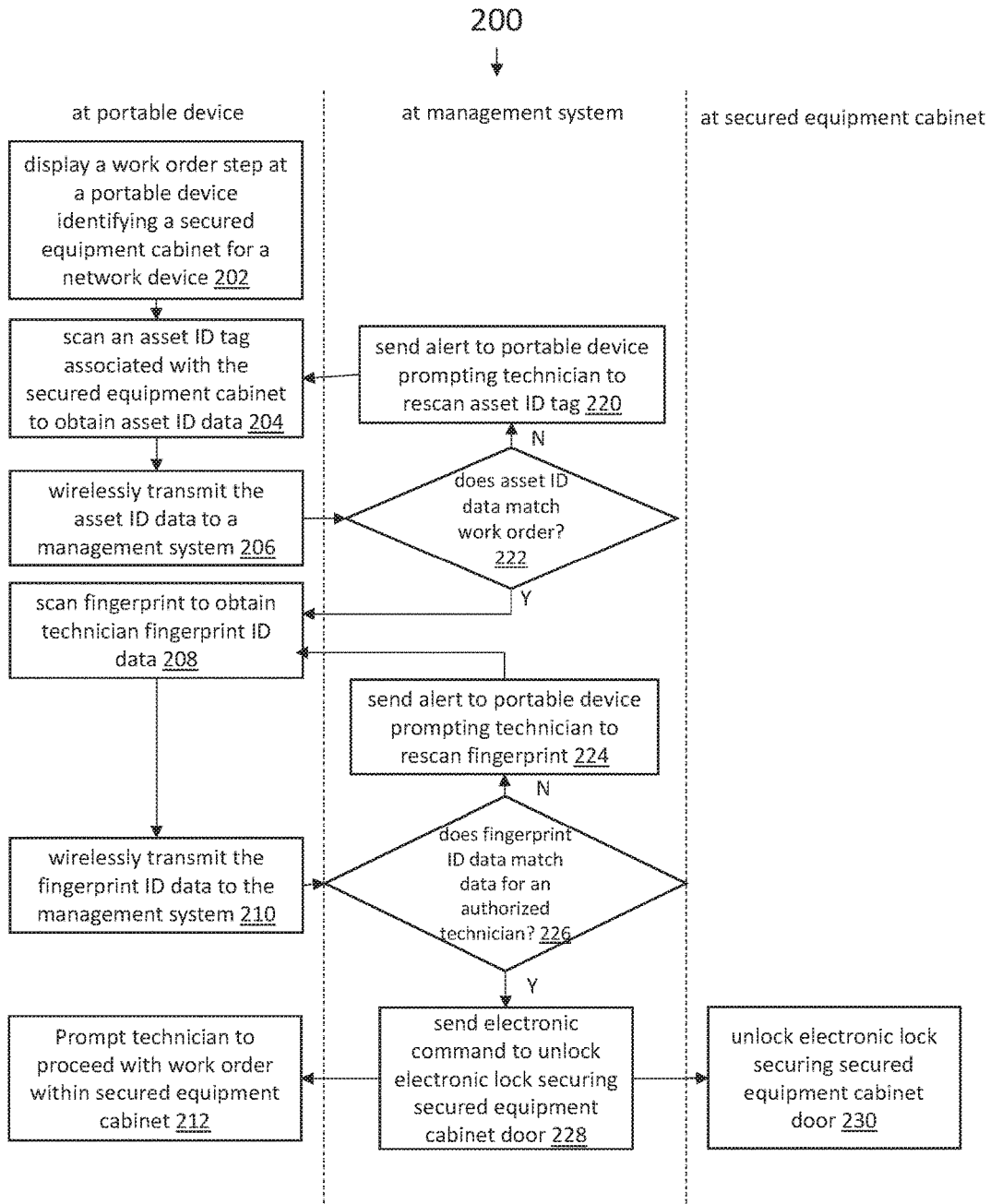
FIG. 2 is a flow diagram of one exemplary embodiment of a method for an automated infrastructure management system.
Figure 2A:
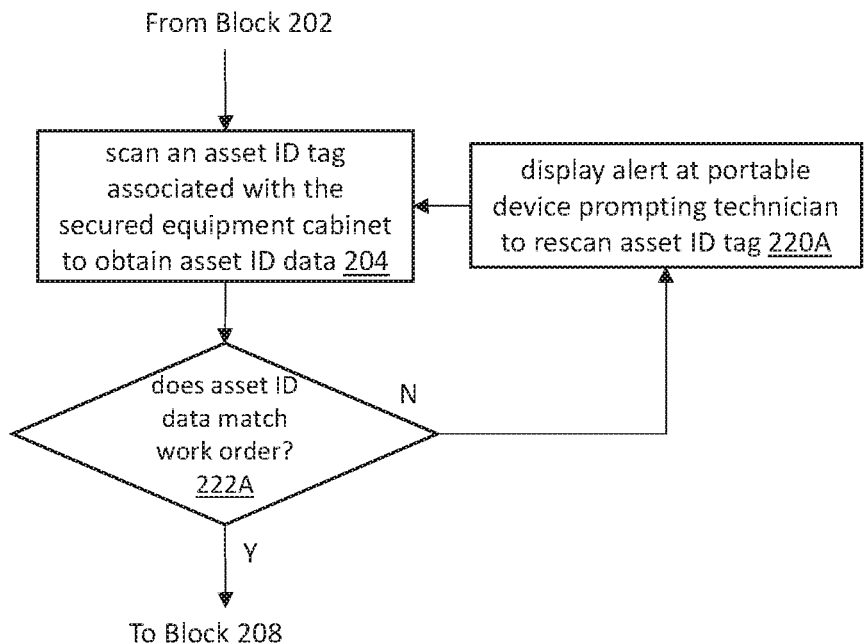
Figure 2B:
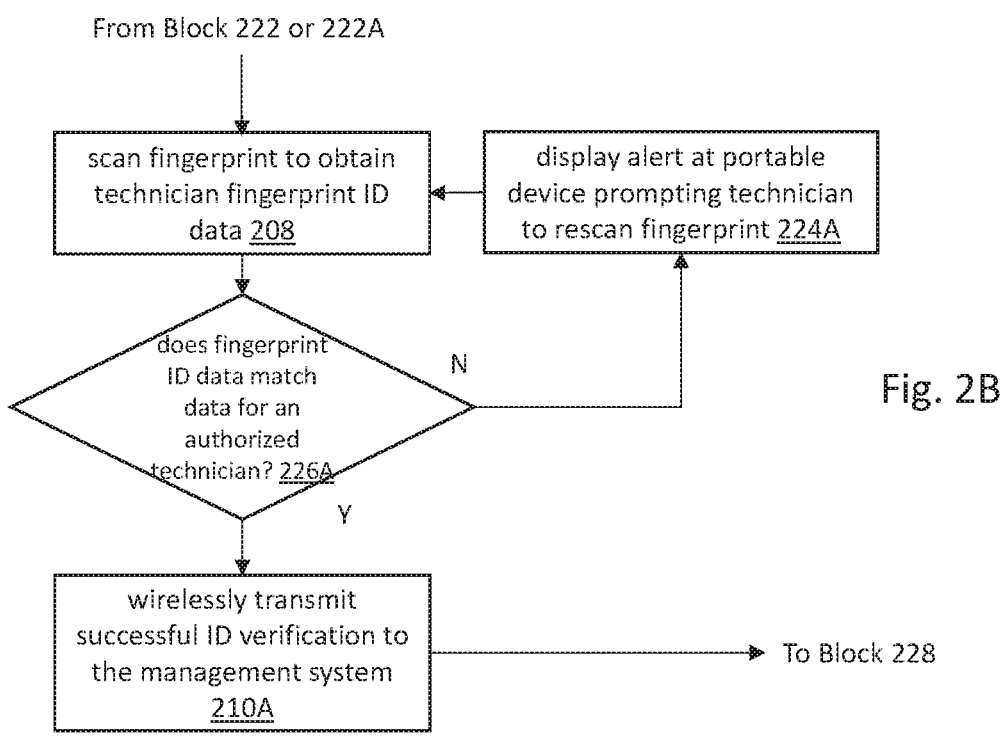

FIGS. 2A and 2B each described an optional variation to the method of FIG. 2.

DETAILED DESCRIPTION

Figure 1:
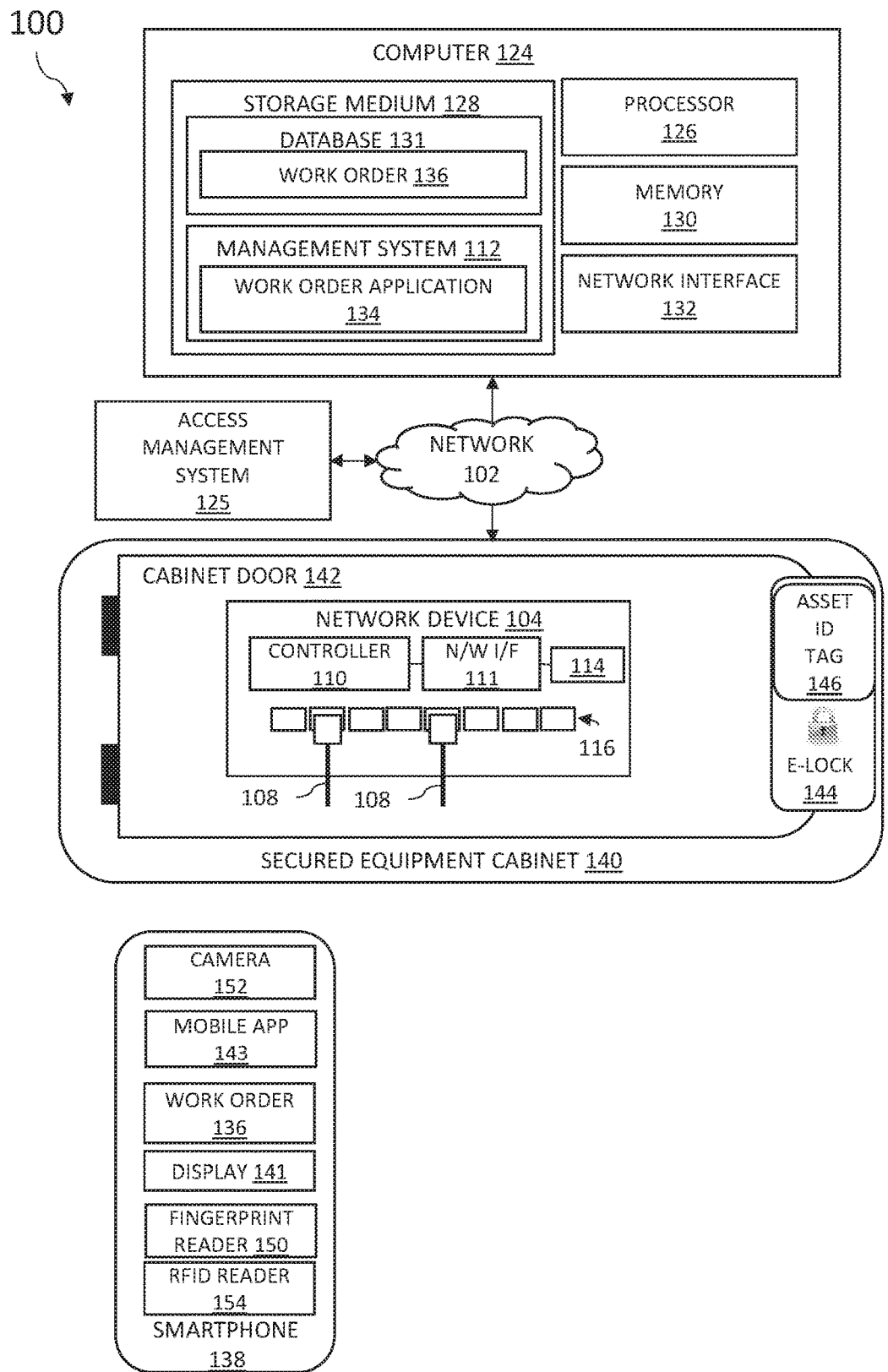
FIG. 1 is a block diagram of one exemplary embodiment of a secured equipment cabinet for network devices.

FIG. 1 is a block diagram of one exemplary embodiment of a secured equipment cabinet 140 within the context of an "Automated Infrastructure Management" (AIM) system 100. As explained in greater detail below, secured equipment cabinet 140 houses one or more network devices 104. In some implementations, network device 104 may comprise any form of telecommunications equipment or assets and may include managed devices, passive devices, or a combination thereof.

In the exemplary embodiment shown in FIG. 1, the AIM system 100 is used to guide technicians in moving, adding, or changing connections made in a network 102. The network 102 includes various network elements or devices to which cables are connected. In the exemplary embodiment shown in FIG. 1, the network 102 includes a network element or device 104 that includes a plurality of ports 106 to which cables 108 can be attached.

In addition, AIM system 100 is used to secure physical access to the network device 104 belonging to network 102. That is, network device 104 is housed within a secured equipment cabinet 140 having a cabinet door 142 secured closed by a remotely operated electronic lock 144. As explained below, AIM system 100 manages access to network device 104 by controlling electronic lock 144, granting access only to authorized technicians who have a task to perform on network device 104. The AIM system 100 can also be used to track physical layer information related to the network 102. As used herein, "physical layer information" comprises information about the cabling, connections, and communication links that exist in the network 102. In some embodiments, network device 104 may by a passively managed device, meaning that AIM system 100 keeps track of the physical layer configuration of network device 104 based on information provided and/or verified by a technician. In other embodiments, network device 104 may be an active device meaning that AIM system 100 and network device 104 can actively communicate with each other about the physical layer configuration of network device 104.

More specifically, in the exemplary embodiment shown in FIG. 1, the network device 104 comprises a patch panel. The patch panel 104 is described here, in this exemplary embodiment, as being designed for use with copper twisted-pair CAT-5, 6, and 7 cables typically used to implement ETHERNET local area networks. The network device 104 can be implemented in other ways (for example, as an optical distribution frame, splitter tray, switch, router, etc.). Also, the network device 104 can be implemented for use with other types of cables (for example, other types of copper cables or fiber optic cables).

In the embodiment illustrated by FIG. 1, network device 104 is shown in the context of being an active device. As such, the network device 104 includes a controller or other programmable processor 110 that is configured to communicate with a management system 112 over the network 102. The network device 104 also includes a network interface 111 for communicatively coupling the network device 104 (more specifically, the controller 110) to the network 102 and, ultimately, the management system 112. In the example shown in FIG. 1, the controller 110 and the network interface 111 are communicatively coupled to the network 102 and the management system 112 by including a respective "management" or "non-service" port 114 in the network device 104. The management port 114 is separate from the "service" ports 116 of that device 104. However, the controller 110 in the network device 104 can be communicatively coupled to the network 102 using one or more of the "service" ports 116.

In the exemplary embodiment shown in FIG. 1, the electronic lock 144 is communicatively coupled to management system 112, which may be implemented via network interface 111. Cabinet 140 further includes an asset identification (ID) tag 146 associated with one or both of secured equipment cabinet 140 and electronic lock 144. In this embodiment, asset ID tag 146 uniquely associated with electronic lock 144 such that it distinguishes electronic lock 144 from any other electronic lock controlled by management system 112. In alternate implementations, asset ID tag 146 may include a bar code, quick response (QR) code, a radio frequency identifier (RFID) interface, or other electronically readable identification scheme for identifying electronic lock 144. In some embodiments, electronic lock 144 is directly controlled by management system 112. In other embodiments, management system 112 controls lock 144 indirectly, such as via an access management system 125. Control of one or more locks via this access management system 125 may be provided, for example, as a service from a third party or vendor. For example, in one embodiment management system 112 includes an Application Programming Interface (API) through which it communicates to the access management system 125 to send lock and unlock commands for electronic lock 144, and through which it may obtain alarm or other status information about electronic lock 144. The access management system 125 (which may by communicatively coupled to electronic lock 144 via network 102, or via another network) then communicates with electronic lock 114 to control locking and unlocking based on the instructions from management system 112.

Power can be supplied to the active components of the network device 104 and lock 144 in various ways (for example, by connecting the managed patch panel 104 to the standard AC power grid, using Power-Over-Ethernet technology, or in other ways).

In the exemplary embodiment shown in FIG. 1, the management system 112 is implemented as software that executes on one or more computers 124. Each computer 124 comprises one or more programmable processors 126 for executing the software. The software comprises program instructions that are stored (or otherwise embodied) on or in an appropriate non-transitory storage medium or media 128 (such as flash or other non-volatile memory, magnetic disc drives, and/or optical disc drives) from which at least a portion of the program instructions are read by the programmable processor 126 for execution thereby. Although the storage media 128 is shown in FIG. 1 as being included in, and local to, the respective computer 124, it is to be understood that remote storage media (for example, storage media that is accessible over the network 102) and/or removable media can also be used. Each computer 124 also includes memory 130 for storing the program instructions (and any related data) during execution by the programmable processor 126. Memory 130 comprises, in one implementation, any suitable form of random access memory (RAM) now known or later developed, such as dynamic random access memory (DRAM). In other embodiments, other types of memory are used. Each computer 124 also includes one or more network interfaces 132 for communicatively coupling the computer 124 to the network 102.

In the example shown in FIG. 1, the management system 112 further includes an electronic work order application 134. The electronic work application 134 is used to construct electronic work orders 136. Each electronic work 136 specifies one or more steps that are to be carried out by a technician at a particular location. For example, an electronic work order 136 can indicate that one or more connections implemented using the service ports 116 of the network device 104 should be added, removed, and/or changed. For steps that involve adding, removing, and/or changing connections made at the service ports 116 of the network device 104, the information that is read from the associated storage devices 122 and communicated to the management system 112 can be used by the electronic work order application 134 to verify that the specified connection has been added, removed, and/or changed correctly.

As described in more detail below, the electronic lock 144 associated with the network device 104 can be controlled to grant access to a technician in carrying out the steps of electronic work orders 136, and re-secure network device 104 once the technician is finished with network device 104.

In this example, each electronic work order 136 is communicated to a portable device 138 that is carried by a technician that has been assigned to carry out that electronic work order 136. In this example, the portable device 138 is implemented using smartphone (and is also referred to here as smartphone 138). However, it is to be understood that each portable device 138 can be implemented in other ways (for example, using tablet computers, laptop computers, or similar devices).

In this example, each smartphone 138 is configured to execute a mobile application 143. The mobile application 143 is configured to communicate with the electronic work order application 134 and the management system 112 and to receive the electronic work orders 136. The mobile application 143 comprises program instructions that are stored (or otherwise embodied) on or in an appropriate non-transitory storage medium or media from which at least a portion of the program instructions are read by at least one programmable processor included in the smartphone 138 for execution thereby.

Each electronic work order 136 can be communicated wirelessly to the smartphone 138 over the Internet (for example, via a cellular or wireless local area network to which the smartphone 138 is wirelessly connected). Each electronic work order 136 can also be communicated to the smartphone 138 in other ways (for example, using a wired connection with the smartphone 138).

A technician that is performing a given work order 136 uses the mobile application 143 executing on a smartphone 138 to help the technician perform the work order 136. The mobile application 143 and the management system 112 are configured so that when a task needs to be performed involving network device 104, the work order 136 identifies the asset ID tag 146 and the associated cabinet 140 in which network device 104 is secured. Using either a camera 152, or another tag reader such a RFID reader 154, installed on smartphone 138, the technician scans the asset ID tag 146. In some embodiments, the scanned information is transmitted back to management system 112 which verifies from the work order 136 whether the technician scanned the correct asset ID tag 146 for the cabinet 140 housing network device 104. If management system 112 determines that the scanned information does not properly correlate with the cabinet 140 for the network device 104 indicated in the work order 136, a warning is provided on display 141 and electronic lock 144 remains locked. In one embodiment, if management system 112 determines that the scanned asset ID information agrees with the cabinet 140 information indicated in the work order 136, then electronic lock 144 may be unlocked, or alternately proceed to verifying the identity of the technician. For example, after management system 112 determines that the scanned information does correlate with the cabinet 140, management system 112 can further request the technician verify their identity via a fingerprint ID. Thus, as opposed to merely identifying that the correct asset ID tag 146 is scanned per the work order 136, management system 112 further verifies that the person physically at cabinet 140 is qualified and/or authorized to enter cabinet 140 to perform work. For example, management system 112 can confirm that the scanned fingerprint belongs to a technician identified by work order 136 as assigned to perform work order 136. Such a feature can be used where an unauthorized party has obtained physical access to smartphone 138 and where any other user ID/passwords may have been compromised. It may also prevent access to a technician who may have inadequate training or other qualifications for performing work in that cabinet. In one implementation, portable device 138 includes a dedicated fingerprint reader 150 which is used by the technician to obtain the fingerprint ID data. In other implementations, an image captured using camera 152 may be used.

Alternatively, as opposed to communicating with management system 112 to validate asset ID and fingerprint ID data, in alternate embodiments, one or both of these verifications can be performed at the smartphone 138, by mobile application 143 for example. In one embodiment, this can be accomplished by comparing the asset ID and/or fingerprint ID data with ID verification data downloaded into smartphone 138 as part of downloading work order 136.

If both the scan of asset ID tag 146 and the scan of the technician's fingerprint are verified (either by management system 112 or locally by smartphone 138), then management system 112 sends an electronic command via network 102 for electronic lock 144 to open cabinet door 142. The electronic command may be in the form of a Simple Network Management Protocol (SNMP) message from management system 112 to electronic lock 144, for example. Alternately, electronic command may be transmitted to a access management system 125 which in turn unlocks the electronic lock 144. Once the technician has completed the necessary tasks on network device 104, cabinet door 142 is closed and electronic lock 144 is re-engaged. In one embodiment, the re-locking of electronic lock 144 may be locally initiated (for example by a lock button on lock 144). Alternatively, management system 112 may send an electronic command via network 102 (either directly or access management system 125) instructing the electronic lock 144 to lock cabinet door 142 upon indication that the appropriate steps in work order 136 are completed.

FIG. 2 is a flow diagram of one exemplary embodiment of a method 200 of remote physical layer access control. The exemplary embodiment of method 200 shown in FIG. 2 is described here as being implemented using the system 100 shown in FIG. 1, though it is to be understood that other embodiments can be implemented in other ways. Moreover, the blocks of the flow diagram shown in FIG. 2 have been arranged for ease of explanation; however, it is to be understood that this arrangement is merely exemplary, and it should be recognized that the processing associated with method 200 (and the blocks shown in FIG. 2) can occur in any order (for example, using standard event-driven programming techniques).

Method 200 comprises display a work order step at a portable device 138 identifying a secured equipment cabinet 140 for a network device 104 (block 202). As discussed above, the mobile application 143 is configured to communicate with the electronic work order application 134 and the management system 112 and to receive the electronic work orders 136. The mobile application 143 displays the next step in the work order 136 to be performed by the technician, and directs the technician to the secured equipment cabinet 140 housing the network device 104 that the technician needs to work on. The technician uses the portable device 138 to scan a asset ID tag 146 associated with the secured equipment cabinet 140 to obtain asset ID data (block 204) and the portable device 138 wirelessly transmits that asset ID data back to the management system 112 (block 206). In some implementations, the asset ID tag 146 may display a bar code, QR code, or similar ID code which the technician scans using the camera 152 of the portable device 138. In other implementations, the asset ID tag 146 may comprise a wirelessly readable ID tag, such as an RFID tag which the technician scans using a reader such as RFID reader 154.

When the management system 112 receives the asset ID data, it may compare the data to the pending work order step which needs to be completed by the technician to verify that that technician has scanned the asset ID tag 146 associated with the correct secured equipment cabinet 140 (block 222). The secured equipment cabinet 140 would in turn be associated with its specific electronic lock 144. If the management system 112 determines that the correct asset ID tag was not scanned, an alert is sent to the portable device 138 and the technician may be prompted to locate the correct secured equipment cabinet 140 and/or rescan the asset ID tag (block 220). When the management system 112 determines that the correct asset ID tag was scanned, the process returns to the portable device 138 where the technician is prompted to scan their fingerprint to obtain technician fingerprint ID data (block 208). In one implementation, portable device 138 includes a dedicated fingerprint reader 150 which is used by the technician to obtain the fingerprint ID data. In other implementations, an image captured using camera 152 may be used. Once obtained, the fingerprint ID data is wirelessly transmitted back to the management system 112. The management system 112 then determines whether the fingerprint ID data matches that of an authorized technician (block 226).

In various alternate implementations, what constitutes an "authorized technician" can vary. For example, in one implementation management system 112 may use the fingerprint ID data to confirm that the technician is on a list of recognized employees of the system operator or an authorized contractor. In another implementation management system 112 may verify that the technician has obtained and/or maintained the proper designated training and/or qualifications for performing work on network device 104. In yet another implementation, management system 112 may refer to work order 136 and confirms that the fingerprint ID data corresponds to a technician who has been specifically assigned to perform work order 136. It should be recognized that any combination of the above, or the inclusion or other criteria, may also be considered by management system 112 to determine whether the scanned fingerprint belongs to an authorized technician.

If the management system 112 determines that the scanned fingerprint does not belong to an authorized technician, an alert is sent to the portable device 138 and the technician may be prompted to attempt to rescan their fingerprint (block 224). An alert to a system operator or log may also occur. When the management system 112 determines that fingerprint ID data corresponds to an authorized technician, management system 112 send an electronic command to the electronic lock 144 at the secured equipment cabinet 140 to unlock the electronic lock 144 and permit the technician to open the cabinet door 142 (blocks 228 and 230). The management system may then send a message to the portable device 138 notifying the technician to proceed with performing the work order 136 (block 212). As an option, in one embodiment the technician via the portable device 138 can send confirmation to management system 112 that electronic lock 144 properly unlocked and request a resend of the electronic command if it did not. Once the technician has completed the necessary tasks on network device 104, cabinet door 142 can be closed and electronic lock 144 re-engaged.

FIGS. 2A and 2B each described variations to the method 200 of FIG. 2. In both of these alternatives, validation of ID data is performed at the smartphone 138 thus eliminating the need to transmit ID data to the management system 112. As shown in FIG. 2A, in one alternate embodiment, upon using the portable device 138 to scan the asset ID tag 146 associated with the secured equipment cabinet 140 to obtain asset ID data (block 204), the method proceeds to block 222A where the mobile application 143 compares the asset ID data to the pending work order 136 stored locally in smartphone 138 to verify that technician has scanned the asset ID tag 146 associated with the correct secured equipment cabinet 140. When the mobile application 143 determines that the correct asset ID tag was not scanned, an alert may be displayer at the portable device 138 and the technician may be prompted to locate the correct secured equipment cabinet 140 and/or rescan the asset ID tag (block 220A). When the mobile application 143 determines at block 222A that the correct asset ID tag was scanned, the process may return to block 208 where the technician is prompted to scan their fingerprint to obtain technician fingerprint ID data.

FIG. 2B shown another alternate embodiment where upon obtaining the fingerprint ID data at block 208, the method proceeds to block 226A where the mobile application 143 compares the fingerprint ID data to the pending work order 136 stored locally in smartphone 138 to verify that the fingerprint ID data matches that of an authorized technician. If the mobile application 143 determines that the scanned fingerprint does not belong to an authorized technician, an alert is displayed at the portable device 138 and the technician may be prompted to attempt to rescan their fingerprint (block 224A). An alert to a system operator or log may also occur. When the mobile application 143 determines that the fingerprint ID data corresponds to an authorized technician, mobile application 143 send an successful ID verification message to the management system 112 (block 210A). The method then returns to block 228 where the management system 122 send the electronic command that will unlock the electronic lock 144 and permit the technician to open the cabinet door 142 (blocks 228 and 230).

It should be appreciated that FIGS. 2, 2A and 2B depict obtaining and verifying the asset ID data prior to the fingerprint ID data for illustration purposes only and that in other embodiments the appropriate steps or series of steps depicted may be performed in an order that facilities obtaining and verifying the fingerprint ID data prior to the asset ID data.

Although the process above details transmission of fingerprint ID data from a portable device 138 to the management system 112 for the purposes of opening locked facilities or equipment cabinets, in other embodiments, obtaining fingerprint ID data may be used for other purposes associated with an electronic work order. For example, in other embodiments, fingerprint ID data may be collected to serve as a digital signature were the technician certifies that one or more critical work order steps have been completed as directed by work order 136. In one such embodiment, the management system 112 is notified by mobile application 143 when the technician completes certain tasks from work order 136. Management system 112 then instructs mobile application 143 to prompt the technician to perform a fingerprint scan as a certification that network device 104 has been altered precisely as set forth in the work order 136. Such a certification may be prudent, for example, before management system 112 returns network device 104 to service. In another example, the process 200 of FIG. 2 may be modified at block 226 so that instead of verifying whether the technician is an authorized technician, management system 112 simply logs the fingerprint ID information before proceeding to block 228.

Example Embodiments

Example 1 includes a system comprising: a secured equipment cabinet, the equipment cabinet comprising: a network device housed within the equipment cabinet; a cabinet door secured by a first electronic lock; and an asset ID tag associated with the electronic lock; a management system communicatively coupled to the electronic lock, wherein the management system is configured to control the electronic lock; at least one portable device in communication with the management system, the at least one portable device configured to execute a work order application that displays information about a work order, and wherein the management system is configured to control displaying of information about the work order on the at least one portable device, the at least one portable device comprising: a tag reader configured to read asset ID data from the asset ID tag; and a fingerprint reader configured to capture fingerprint ID data from a technician; wherein the management system controls the first electronic lock based on the asset ID data and the fingerprint ID data.

Example 2 includes the system of Example 1, wherein the management system is configured to control the electronic lock indirectly via an access management system.

Example 3 includes the system of any of Examples 1-2 wherein the asset ID tag comprises one of either a bar code or a QR code and wherein the tag reader comprises a camera that captures an image of the asset ID tag to read the asset ID data.

Example 4 includes the system of any of Examples 1-3 wherein the asset ID tag comprises an electronically readable identification tag.

Example 5 includes the system of Example 4, wherein the asset ID tag comprises an RFID tag and the tag reader comprises an RFID reader.

Example 6 includes the system of any of Examples 1-5, wherein the fingerprint reader comprises a camera.

Example 7 includes the system of any of Examples 1-6, wherein the fingerprint reader comprises a fingerprint scanning device.

Example 8 includes the system of any of Examples 1-7 wherein the management system determines whether the asset ID data is associated with a lock identified by the electronic work order.

Example 9 includes the system of any of Examples 1-8 wherein the management system determines whether the fingerprint ID data is associated with an authorized technician identified by the electronic work order.

Example 10 includes the system of Examples 9 wherein when the management system determines that the asset ID data is associated with a lock identified by the electronic work order and that the fingerprint ID data is associated with an authorized technician identified by the electronic work order, the management system sends an electronic command to unlock the first electronic lock.

Example 11 includes the system of any of Examples 1-10 wherein the work order application determines whether the asset ID data is associated with a lock identified by the electronic work order.

Example 12 includes the system of any of Examples 1-10 wherein the work order application determines whether the fingerprint ID data is associated with an authorized technician identified by the electronic work order.

Example 13 includes the system of Example 12 wherein when the work order application determines that the asset ID data is associated with a lock identified by the electronic work order and that the fingerprint ID data is associated with an authorized technician identified by the electronic work order, the management system sends an electronic command to unlock the first electronic lock.

Example 14 includes the system of any of Examples 1-13 wherein the at least one portable device is in wireless communication with the management system.

Example 15 includes a method performed using an automated infrastructure management system comprising a portable device, a management system and a secured equipment cabinet, the method comprising: scanning an asset ID tag with the portable device to obtain asset ID data transmitting the asset ID data to the management system; verifying whether the asset ID data is associated with an electronic lock identified by an electronic work order, where the work order defines one or more tasks involving a network device within the secured equipment cabinet; scanning a fingerprint with the portable device to obtain fingerprint ID data; verifying whether the fingerprint ID data matches an authorized technician; when the asset ID data is verified as associated with the electronic lock and the fingerprint ID data is verified as matching the authorized technician, sending an electronic command from the management system that unlocks the electronic lock.

Example 16 includes the method of Examples 15 verifying one or both of the asset ID data and the fingerprint ID data is performed at the management system.

Example 17 includes the method of any of Examples 15-16 wherein verifying one or both of the asset ID data and the fingerprint ID data is performed at the portable device.

Example 18 includes the method of any of Examples 15-17 wherein the management system is configured to control the electronic lock by sending the electronic command to an access management system.

Example 19 includes the method of any of Examples 15-18 further comprising: displaying an alert at the portable device when either the asset ID data does not match the electronic lock or the fingerprint ID data does not match the authorized technician.

Example 20 includes the method of any of Examples 15-19, wherein the electronic work order includes a listing of one or more authorized technicians and whether the fingerprint ID data matches an authorized technician is based on the listing of one or more authorized technicians.

Example 21 includes the method of any of Examples 15-20, wherein scanning the asset ID tag comprises scanning one of either a bar code or a QR code and wherein the portable device comprises a camera that captures an image of the asset ID tag to obtain the asset ID data.

Example 22 includes the method of any of Examples 15-21, wherein scanning the asset ID tag comprises scanning an electronically readable identification tag.

Example 23 includes the method of Example 22 wherein the asset ID tag comprises an RFID tag and scanning the electronically readable identification tag the tag reader comprises scanning the RFID tag with the portable device.

Example 24 includes the method of any of Examples 15-23, wherein scanning a fingerprint with the portable device to obtain fingerprint ID data comprises scanning the fingerprint using a camera.

Example 25 includes the method of any of Examples 15-24, wherein scanning a fingerprint with the portable device to obtain fingerprint ID data comprises scanning the fingerprint using a fingerprint scanning device.

Example 26 includes a method performed using an automated infrastructure management system comprising a portable device, a management system and a network device, the method comprising: at the portable device executing a work order application that displays information about a work order associated with the network device, wherein the management system is configured to control displaying of information about the work order on the at least one portable device; scanning a fingerprint with the portable device to obtain fingerprint ID data; and transmitting the fingerprint ID data to the management system.

Example 27 includes the method of Example 26 further comprising: logging the fingerprint ID data at the management system in a log associated with the work order.

Example 28 includes the method of Example 27 further comprising: verifying with the management system whether the fingerprint ID data matches ID data for an authorized technician.

A number of embodiments have been described. Nevertheless, it will be understood that various modifications to the described embodiments may be made without departing from the spirit and scope of the claimed invention.

What is claimed is:
1. A system comprising:
a secured equipment cabinet, the secured equipment cabinet comprising:
a network device housed within the secured equipment cabinet;
a cabinet door secured by an electronic lock; and
an asset identifier (ID) tag associated with the electronic lock and comprising asset ID data;
a management system, comprising a work order application, communicatively coupled to the electronic lock, wherein the management system is configured to control the electronic lock;
at least one portable device, comprising a mobile application, in communication with the management system, the at least one portable device configured to execute the mobile application that displays information about an electronic work order, and wherein the management system is configured to control displaying of information about the electronic work order on the at least one portable device, the at least one portable device comprising:
a tag reader configured to read the asset ID data from the asset ID tag; and
a fingerprint reader configured to capture fingerprint ID data from a technician; and
wherein the management system controls the electronic lock based on the asset ID data and the fingerprint ID data.
2. The system of claim 1, wherein the management system is configured to control the electronic lock indirectly via an access management system.

3. The system of claim 1, wherein the asset ID tag comprises one of either a bar code or a QR code and wherein the tag reader comprises a camera that captures an image of the asset ID tag to read the asset ID data.

4. The system of claim 1, wherein the asset ID tag comprises an electronically readable identification tag.

5. The system of claim 4, wherein the asset ID tag comprises an RFID tag and the tag reader comprises an RFID reader.

6. The system of claim 1, wherein the fingerprint reader comprises a camera.

7. The system of claim 1, wherein the fingerprint reader comprises a fingerprint scanning device.

8. The system of claim 1, wherein the management system determines whether the asset ID data is associated with an electronic lock identified by the electronic work order.

9. The system of claim 1, wherein the management system determines whether the fingerprint ID data is associated with an authorized technician identified by the electronic work order.

10. The system of claim 8, wherein when the management system determines that the asset ID data is associated with the electronic lock identified by the electronic work order and that the fingerprint ID data is associated with an authorized technician identified by the electronic work order, the management system sends an electronic command to unlock the electronic lock.

11. The system of claim 1, wherein the work order application determines whether the asset ID data is associated with an electronic lock identified by the electronic work order.

12. The system of claim 1, wherein the work order application determines whether the fingerprint ID data is associated with an authorized technician identified by the electronic work order.

13. The system of claim 12, wherein when the work order application determines that the asset ID data is associated with the electronic lock identified by the electronic work order and that the fingerprint ID data is associated with an authorized technician identified by the electronic work order, the management system sends an electronic command to unlock the electronic lock.

14. The system of claim 1, wherein the at least one portable device is in wireless communication with the management system.

15. A method performed using an automated infrastructure management system comprising a portable device, a management system and a secured equipment cabinet, the method comprising:
 scanning an asset identifier (ID) tag with the portable device to obtain asset ID data;
 transmitting the asset ID data to the management system;
 verifying whether the asset ID data is associated with an electronic lock identified by an electronic work order, where the electronic work order defines one or more tasks involving a network device within the secured equipment cabinet;
 scanning a fingerprint with the portable device to obtain fingerprint ID data;
 verifying whether the fingerprint ID data matches an authorized technician; and
 when the asset ID data is verified as associated with the electronic lock and the fingerprint ID data is verified as matching the authorized technician, sending an electronic command from the management system that unlocks the electronic lock.

16. The method of claim 15, wherein verifying one or both of the asset ID data and the fingerprint ID data is performed at the management system.

17. The method of claim 15, wherein verifying one or both of the asset ID data and the fingerprint ID data is performed at the portable device.

18. The method of claim 15, wherein the management system is configured to control the electronic lock by sending the electronic command to an access management system.

19. The method of claim 15, further comprising:
 displaying an alert at the portable device when either the asset ID data does not match the electronic lock or the fingerprint ID data does not match the authorized technician.

20. The method of claim 15, wherein the electronic work order includes a listing of one or more authorized technicians and whether the fingerprint ID data matches an authorized technician is based on the listing of one or more authorized technicians.

21. The method of claim 15, wherein scanning the asset ID tag comprises scanning one of either a bar code or a QR code and wherein the portable device comprises a camera that captures an image of the asset ID tag to obtain the asset ID data.

22. The method of claim 15, wherein scanning the asset ID tag comprises scanning an electronically readable identification tag.

23. The method of claim 22, wherein the asset ID tag comprises an RFID tag and scanning the electronically readable identification tag the tag reader comprises scanning the RFID tag with the portable device.

24. The method of claim 15, wherein scanning a fingerprint with the portable device to obtain fingerprint ID data comprises scanning the fingerprint using a camera.

25. The method of claim 15, wherein scanning a fingerprint with the portable device to obtain fingerprint ID data comprises scanning the fingerprint using a fingerprint scanning device.

* * * * *